Patented Jan. 11, 1949

2,458,504

UNITED STATES PATENT OFFICE 2,458,504

REACTION PRODUCTS OF GELATIN AND ALDONIC ACIDS AND PROCESS FOR MAKING SAME

Allan E. Chester, Highland Park, and Frederick F. Reisinger, Waukegan, Ill., assignors to Poor & Company, Chicago, Ill., a corporation of Delaware No Drawing. Application March 6, 1944, Serial No. 525,323

12 Claims. (Cl. 260—117)

This invention relates to new and useful protein derivatives and to a method for the manufacture thereof.

One of the objects of the invention is to produce new and improved protein derivatives which form stable solutions in water.

Another object of the invention is to produce new and improved protein derivatives which form solutions in water, and which are stable even under the influence of heat.

Another object of the invention is to produce new and useful products from gelatin in the form of aqueous solutions which do not form precipitates and do not tend to coagulate on standing over long periods of time.

Another object of the invention is to produce new and improved compositions which are especially adapted for use in alkaline zinc cyanide electrolyte baths.

A further object of the invention is to produce new and improved aldonic acid compositions.

Another object of the invention is to provide a new and improved method of producing compositions of the type described above. Other objects will appear hereinafter.

In accomplishing these objects in accordance with this invention, it has been found that new and useful products are obtained by the reaction of gelatin with aldonic acids, preferably gluconic acid. In accordance with the invention, these products are prepared by heating together gelatin and an aqueous solution of an aldonic acid, such as for example gluconic acid. The aldonic acid forms a gel with the gelatin, which gradually disappears upon further heating and with the addition of water. The resultant product is a clear stable solution, usually somewhat yellow in color. This product can be added directly to alkaline zinc cyanide electroplating baths to improve the brightness of the finish of the electroplated article, and the primary importance of the product at the present time is for this purpose. However, it will be understood that the product can also be used as a food, a food supplement, for medicinal purposes, and for many other applications.

One of the important features of this product is its great stability on standing over long periods of time. It does not deteriorate, coagulate, or precipitate when added to alkaline zinc cyanide baths, even after heating at temperatures such as are ordinarily employed in electroplating. In this respect the product differs quite markedly from gelatin per se, which merely floats around in masses or blobs when added to the ordinary alkaline zinc plating bath.

When the products are employed in electroplating baths, it is preferable to use in their preparation an excess of the aldonic acid, thereby providing a convenient way of adding an aldonic acid to the bath. The aldonic acid forms a complex metallo organic compound with the metallic ions present in the bath.

In the preparation of compositions to be used in electroplating zinc in alkaline cyanide baths a further feature of the invention is the addition of furfural to the gelatin-aldonic acid derivative. Furfural forms with the solution of this derivative a clear stable solution of a somewhat deeper yellow color than that of the gelatin-aldonic acid derivative. Ordinarily, it is very difficult to add substantial amounts of furfural to electroplating baths, but by adding the furfural to the gelatin-aldonic acid derivative first, no such difficulty is encountered. The composition containing furfural has the added advantage in electroplating baths of the alkaline zinc cyanide type that it enhances the smoothness of the deposit as compared with gelatin-aldonic acid compositions not containing the furfural. The latter compositions, however, will nevertheless produce very bright finishes.

The invention is illustrated but not limited by the following examples:

Example I

The gluconic acid-gelatin derivative was prepared by mixing together 34 grams of gelatin and 100 cc. of 50% gluconic acid. The reaction mixture was digested from ½ to 1 hour at a temperature of from 80 to 120° F. The mixture was then stirred vigorously and the temperature gradually raised to 180° F. with the addition of 490 cc. of water. The gluconic acid forms a gel with the gelatin, and the addition of the water with vigorous stirring and heating converts this gel into a solution. The resultant product is stable and does not tend to precipitate or coagulate on standing. It is clear and has a yellowish color. This product can be added directly to an alkaline zinc cyanide electroplating bath with excellent results. It can also be used for other purposes, as for example in foods.

*Example II*

A gelatin-gluconic acid derivative was prepared as in Example I, except that 15 cc. of furfural was added to the solution after it had been heated to 180° F. and while it was still hot. The furfural may also be added after the solution is cool. This produced a clear stable solution having a somewhat deeper yellow color, which gave excellent results both as to brightness and smoothness of finish in alkaline zinc cyanide electroplating baths.

*Example III*

This example illustrates the application of the products of Examples I and II and the preparation of alkaline zinc cyanide electrolytes.

An electrolyte was prepared by mixing together the following ingredients:

90–100 grams sodium cyanide
36–40 grams zinc metal
100–115 grams sodium hydroxide and enough water to make 1 liter of solution
2 grams per liter of zinc dust was stirred into the electrolyte and the entire mixture was filtered in order to remove traces of heavy metals.

This electroplating bath when employed in a conventional manner ordinarily produces zinc electroplated articles with a dull gray finish. Upon the addition of either of the products of Examples I or II, however, preferably in amounts corresponding to from 60 to 80 cc. of either of said products per gallon of the above described alkaline zinc cyanide electrolyte, bright finishes are obtained.

In electroplating operations with these electrolytes especially good results with respect to the brightness of the finish are obtained with current densities up to 30–40 amperes per square foot. At greater current densities bright zinc coatings are still obtained, but in general the coatings are not quite as bright as those obtained at the lower current densities. The products are especially useful in barrel plating operations but can be used in other types of operations without burning of the coating even at the higher current densities.

The invention is susceptible to some variation and modification in the manner of its practical application. In general, it its preferable to employ gluconic acid because it is the most cheaply and readily available of all of the aldonic acids. The gluconic acid is ordinarily employed in the form of an aqueous solution and usually has a concentration not substantially greater than 50%, because at the higher concentrations it tends to go into the crystalline lactone form. The minimum concentration of aldonic acid employed is that which will form a gel with the gelatin. As examples of other aldonic acids which may be used, mention is made of the following: Mannonic, arabonic, galactonic, and xylonic. These acids are obtained by the oxidation of the corresponding aldoses and all have alpha and beta lactone forms.

The gelatin employed may be any of the ordinary types of gelatins obtained from animal tissues in the usual way, by boiling them under pressure with water. The term "gelatin" is used herein in its ordinary sense, as defined in Hackh's Chemical Dictionary, 1929, page 326.

The invention provides new and improved protein derivatives which form stable solutions in water and do not tend to coagulate or precipitate when added to alkaline baths such as those used in the electroplating of zinc. The invention also provides a new and improved method for producing products of the type described. These products not only give excellent results when added as such to electroplating baths, but also form stable solutions with other substances, such as for example furfural, which are not ordinarily compatible with the electroplating baths when added thereto as such. These new compositions therefore afford an easy way of supplying additional substances to the electroplating bath. In this respect they are also important in that they afford a convenient means for adding aldonic acids to such baths.

The invention is hereby claimed as follows:

1. A composition comprising furfural and the reaction product of a gelatin with an aldonic acid dissolved in water.

2. A composition comprising furfural and the reaction product of a gelatin with a gluconic acid dissolved in water.

3. The method of preparing a gelatin-aldonic acid derivative which comprises reacting gelatin with an aldonic acid at a temperature of about 80° F. to 120° F. for about ½ to 1 hour in the presence of water and heating the resultant mixture while stirring to a temperature of about 180° F. and with the addition of a further quantity of water.

4. The method of preparing a gelatin-gluconic acid derivative which comprises reacting gelatin and gluconic acid in the presence of sufficient water to form a gel and heating said gel with the addition of a further quantity of water until a clear solution is obtained.

5. The method of preparing a gelatin-gluconic acid derivative which comprises digesting a gelatin and a sufficient amount of 50% gluconic acid to form a gel for a period of about ½ to 1 hour at a temperature within the range from about 80° F. to 120° F. and then adding an additional quantity of water with stirring and heating to a higher temperature until a clear solution is obtained.

6. The method of preparing a gelatin-aldonic acid derivative which comprises digesting a gelatin with an aldonic acid in proportions sufficient to form a gel under the influence of heat and in the presence of water, heating said gel with the addition of a further quantity of water until a clear solution is obtained, and adding a substantial quantity of furfural to the reaction mixture.

7. The method of preparing a furfural-gelatin-gluconic acid derivative which comprises digesting a gelatin and a sufficient amount of 50% gluconic acid to form a gel for a period of about ½ to 1 hour at a temperature within the range from about 80° F. to 120° F. and then adding an additional quantity of water with stirring and heating to a higher temperature until a clear solution is obtained, and adding a substantial quantity of furfural to said solution while it is still hot.

8. The method of preparing a gelatin-aldonic acid derivative which comprises reacting gelatin and an aldonic acid in the presence of sufficient water to form a gel, and heating said gel with the addition of a further quantity of water until a clear solution is obtained.

9. The product resulting from reacting gelatin and an aldonic acid in the presence of sufficient water to form a gel and heating said gel with the addition of a further quantity of water until a clear solution is obtained.

10. The product resulting from reacting a gelatin with gluconic acid in the presence of sufficient water to form a gel and heating said gel with the addition of a further quantity of water until a clear solution is obtained.

11. The product resulting from the process of claim 3.

12. The product resulting from the process of claim 5.

ALLAN E. CHESTER.
FREDERICK F. REISINGER.

REFERENCES CITED

The following references are of record in the file of this patent:

UNITED STATES PATENTS

| Number | Name | Date |
|---|---|---|
| 1,468,331 | Soane | Sept. 18, 1923 |
| 1,536,012 | Joslin | Apr. 28, 1925 |
| 1,631,671 | Dreher | June 7, 1927 |
| 1,892,725 | Griessbach et al | Jan. 3, 1933 |
| 2,057,476 | Cohn | Oct. 13, 1936 |
| 2,257,440 | Wood | Sept. 30, 1941 |
| 2,305,622 | Kremers | Dec. 22, 1942 |